United States Patent Office 3,310,512
Patented Mar. 21, 1967

3,310,512
WATER DISPERSIBLE RESINS COMPRISING POLYALKYLENE GLYCOL, DICARBOXYLIC ACID AND POLYHYDRIC ALCOHOL
Gerald M. Curtice, Savage, Minn., assignor to Archer-Daniels-Midland Company, Minneapolis, Minn., a corporation of Delaware
No Drawing. Filed Aug. 4, 1965, Ser. No. 477,322
13 Claims. (Cl. 260—29.4)

This is a continuation-in-part of Serial No. 195,964, filed May 18, 1962, now U.S. Patent 3,223,659.

The present invention relates to water dispersible resins, their preparation and use. In another aspect, the present invention relates to water dispersible polyesters which are formed by reacting one or more dicarboxylic acids with one or more polyhydric alcohols and with one or more hydrophilic polyalkylene glycols.

Coatings have been produced in the past by co-reacting certain polyesters with thermosetting resinous condensates (e.g., with phenol-formaldehyde resins). However, these prior art polyesters were generally insoluble in water. Consequently, they were usually applied from organic solvents. Where organic solvents were employed, the usual fire and health hazards (as well as cost) associated with such organic solvents were inevitably present.

I have noted that when such polyesters are modified by the inclusion therein of large proportions of hydrophilic groups (e.g., hydroxyl groups and carboxyl groups) in an effort to obtain water dispersibility, cured films obtained from aqueous coating systems containing such modified polyesters are generally lacking in moisture resistance for most practical uses. Similarly, when water dispersibility is obtained by reducing the average molecular weight of the polyester, cured films obtained therefrom have been lacking in cohesion, flexibility, and toughness. Likewise, polyester resins processed to high acid values (e.g., 50 to 150) suffer in water resistance, flexibility, and the like, apparently because of the high residual acidity and the low molecular weight.

In contrast, my invention involves the preparation and use, particularly in aqueous coating systems, of a stable, water dispersible polyester having a low acid value. The polyester of my invention is the reaction product of a dicarboxylic acid and at least two polyols. One of the polyols is hydrophilic in nature and imparts water dispersibility to the final resin. However, this hydrophilic polyol (a polyalkylene glycol) is utilized in low concentrations and does not substantially increase the water sensitivity of the cured films which are ultimately obtained. As formulated, the polyester has enough excess functionality to co-react with a suitable water soluble cross-linking resin (e.g., a melamine-formaldehyde resin) to produce a cured film having a highly cross-linked network. I believe that this cross-linked network substantially masks any potentially water sensitive areas of the film. In any event, the water sensitivity of cured films obtained from my preferred polyesters is low when contrasted to prior art products of the same general type.

As regards the term "polyol," this term has been used herein to generically describe both polyalkylene glycols and polyhydric alcohols. The latter term (i.e., "polyhydric alcohol") has been used in a narrower sense, as evidenced by its description which is set forth infra.

The carboxylic acid component of my polyesters is selected from the group consisting of aliphatic and aromatic dicarboxylic acids. If desired, mixtures of acids can be employed. Particularly desirable polyester resins can be prepared from a mixture of aliphatic and aromatic dicarboxylic acids. Suitable aliphatic dicarboxylic acids are the non-oxidizing dicarboxylic acids containing 4 to 18 carbon atoms. I generally prefer to employ saturated, aliphatic dicarboxylic acids (or the anhydrides thereof) containing from 4 to 10 carbon atoms inclusive. Particularly preferred are those saturated aliphatic dicarboxylic acids containing from 5 to 8 carbon atoms. Illustrative aliphatic dicarboxylic acids are adipic acid, succinic acid, glutaric acid, sebacic acid, azelaic acid, and the like. The aromatic dicarboxylic acids which can be used in preparing the polyesters of this invention are preferably the phthalic acids or their anhydrides. Isophthalic and terephthalic acids are particularly effective. o-Phthalic acid acid can be used, but I prefer to employ the corresponding anhydride. Halogenated, e.g., chlorinated, phthalic acids can also be used. Thus, monochlorophthalic acid and chlorendic acid are contemplated for use in preparing the polyesters of this invention (particularly in admixture with non-halogenated acids).

As previously indicated, at least two polyols are used in practicing my invention. The first is a polyalkylene glycol having an average molecular weight in the range of 600 to 6000. The preferred average molecular weight is within the range of 1000 to 2000, e.g., about 1500. Polyethylene glycols and polypropylene glycols can be used. Polyethylene glycols are particularly preferred. These glycols are usually formed by the condensation of ethylene oxide or propylene oxide to produce a glycol having multiple ether linkages and an average molecular weight as previously indicated. Commercially available polyalkylene glycols of this type are sold under the name "Carbowaxes" and "Polyglycols E and P." If desired, mixtures of polyalkylene glycols can be employed.

The second polyol used in formulating the water dispersible polyester resins of my invention are the cyclic and acyclic polyhydric alcohols containing from 2 to 16 carbon atoms. Mixtures of polyhydric alcohols can be used. Preferred polyhydric alcohols are the saturated aliphatic alcohols. In the ordinary practice of my invention, saturated aliphatic alcohols containing 2 or more hydroxyl groups and from 2 to 8 carbon atoms are employed. It is especially preferred that the polyhydric alcohol employed contain 3 or more hydroxyl groups. When glycols, e.g., ethylene glycol, are employed as the polyhydric alcohol, it is preferred to use them in admixture with polyhydric alcohols containing 3 or more hydroxyl groups. Such a mixture of polyhydric alcohols should preferably contain at least 15 mole percent of the polyhydric alcohols having 3 or more hydroxyl groups. Suitable glycols include ethylene glycol, diethylene glycol, trimethylene glycol, 1,6-hexane diol, neopentyl glycol, 2,2,4-trimethyl-1,3-pentane diol, and hydrogenated bisphenol-A, as well as mixtures thereof. Examples of polyhydric alcohols containing more than 2 hydroxyl groups are glycerine, pentaerythritol, dipentaerythritol, trimethylol ethane, trimethylol propane, sorbitol, mannitol, and inositol, as well as mixtures thereof.

In preparing the polyesters of my invention, the polyols are reacted with the dicarboxylic acids under esterification conditions. Usually, the ratio of polyol (polyhydric alcohol plus polyalkylene glycol to dicarboxylic acid will be within the range of from 0.95 to 1.8 and preferably from 1.05 to 1.4 moles of polyol per 1.0 mole of dicarboxylic acid. The polyol will usually contain from 1 to 10 mole percent, preferably from 2 to 5 mole percent, e.g., 3 to 4 mole percent polyalkylene glycol with the remainder being polyhydric alcohol.

My esterification reaction is ordinarily conducted at temperatures within the range of 350° to 575° F., and more usually within the range of 370° to 500° F. Esterification must be continued until an acid value of less than 30 is reached if a commercially acceptable product is to be produced. I have found it convenient to terminate esterification after the acid value has dropped below 25. Thus, esterification can be halted when an acid value has dropped below 20 or 15 or 10. If desired, the esterification can be conducted under an inert atmosphere (e.g., nitrogen). Also, ordinary esterification catalysts can be used, if desired. However, I have found that catalysts are not necessary to obtain a suitable product.

All of the polyester ingredients can be reacted simultaneously. The reaction can also be conducted step-wise with incremental addition of each polyol and dicarboxylic acid. In this manner a definite structural pattern can be obtained in the polyester. In any case, the ultimate polyester produced according to this invention is believed to have terminal hydroxyl groups, as well as some hydroxyl groups spaced at intervals along the polyester molecule.

Once the polyester forming ingredients have been reacted to form a polyester of the desired acid value, the polyester can be dispersed in water. Dispersion can be conducted by (1) neutralizing the residual acidity in the polyester resin, and then adding the neutralized resin to the water (preferably under rapid agitation), or (2) by addition of the resin under rapid agitation to a mixture of the water and a suitable neutralizing agent. Both methods produce similar results.

Although common neutralizing agents such as potassium hydroxide and the like can be used to neutralize the residual acidity, I prefer to use a volatile, non-metallic, neutralizing agent. This is because the metal cation seems to result in inferior cured films, from the standpoint of moisture resistance. As a neutralizing agent, I prefer to use ammonia, or an amine (i.e., a primary, secondary, or tertiary amine) which is volatile at temperatures of less than 375° F. (measured at normal atmospheric pressure). Suitable neutralizing agents include ammonia, sodium hydroxide, alkyl amines, dialkyl amines, trialkyl amines, alkanol amines, dialkyl alkanol amines, alkyl dialkanol amines, and the like. Of these, the tertiary amines (e.g., the trialkyl amines) are preferred in that they seem to cause the least amount of ester cleavage in the dispersed polymer.

In some cases, it is desirable to use co-solvents to produce a more stable aqueous dispersion of the polyester. The co-solvent can be added prior to, during, or after neutralization. Among the co-solvents which can be utilized are Cellosolve acetate, butyl Carbitol, Cellosolve, Carbitol, and tertiary butanol, all of which have been used successfully.

In any event, aqueous dispersions of my polyester resins exhibit very good stability for a water dispersed polyester. Preferred resins prepared according to this invention have been demonstrated to remain dispersed in water at elevated temperatures (120° F.) for long periods (6 months) of time. During this time, a slight drop in pH and viscosity have been noted.

Prior to use, or at the time of use, the dispersed polyesters of my invention are mixed with a water soluble cross-linking resin (e.g., an aminoplast). Suitable cross-linking resins include the phenol-formaldehyde resins, the urea-formaldehyde resins (e.g., a methylolated urea-formaldehyde resin), melamine-formaldehyde resins (e.g., a methylolated melamine-formaldehyde resin) and the like. Melamine-formaldehyde resins are particularly preferred as cross-linking agents for the polyester resins of the present invention. Suitable water-soluble cross-linking resins are known, and their selection is an act well within the skill of one routinely engaged in this art.

In application, an aqueous coating composition containing my polyester resin and a suitable cross-linking agent is spread in film form on a suitable substrate (e.g., metal, paper, textiles and the like) and cured. Curing can be conveniently effected by heating at temperatures of from 215° to 375° F., usually 225° to 300° F. Rapid cures at higher temperatures, e.g., 425° F., can also be used. The cured films obtained from these aqueous coating compositions are characterized by excellent adhesion to the substrate, good flexibility, toughness, and solvent resistance.

The present invention is further illustrated by the following specfic examples, which include a preferred embodiment. Unless otherwise indicated, all parts and percentages are by weight.

EXAMPLE I

Ingredients: Parts
- (A) Isophthalic acid ———————————— 200
- (B) Adipic acid ———————————————— 46.2
- (C) Carbowax 1540 (polyethylene glycol; average molecular weight of 1450) ———————— 99
- (D) Hydrogenated bisphenol-A —————— 75
- (E) Trimethylol ethane ————————————— 190

All of the raw materials, A–E were charged to a three-necked flask fitted for esterification. A small amount (7 percent) of high boiling solvent (Carbitol acetate) was added. The flask was then heated to 482° F. and held at this temperature for three hours. After this time, the acid value had fallen to 10.8. The flask was cooled to 284° to 302° F. To another flask were added 592 parts of water and 8 parts of triethyl amine. This aqueous solution was heated to 140° F. Then 500 parts of the hot polyester resin were added to the aqueous amine solution under rapid agitation. Upon cooling, the resulting polyester dispersion had an opalescent appearance. The viscosity was 1630 c.p.s. (measured using a #4 spindle at 100 r.p.m. on a Brookfield RVT Viscometer). The pH was 7.3.

Next, 150 parts of the polyester dispersion were combined with 21 parts of a 70 percent NV aqueous solution of a melamine-formaldehyde condensate (Monsanto RI-2027). A clear 0.003 inch wet film was cast on a glass plate and allowed to dry at room temperature for 15 minutes. The film was then baked at 248° F. for 30 minutes. The cured film had a Sward hardness of 24 and exhibited good flexibility, adhesion, and solvent resistance.

EXAMPLE II

Ingredients: Parts
- (A) Isophthalic acid ———————————— 498
- (B) Neopentyl glycol ———————————— 324
- (C) Adipic acid ———————————————— 438
- (D) Carbowax 1540 (polyethylene glycol; average molecular weight of 1450) ———————— 360
- (E) Trimethylol ethane ————————————— 444

Ingredients A–E were charged to a flask fitted for esterification and then heated to 383° F. This temperature was maintained for 8 hours. The acid value was then 22.9.

After the resulting polyester resin had been dispersed in a water triethyl amine solution to a solids level of 43 percent (following the procedure of Example I), the viscosity was found to be 7850 c.p.s. (measured using a #4 spindle at 20 r.p.m. on a Brookfield RVT Viscometer). The pH was 7.0. A clear wet film (0.003 inch) was cast and cured as in Example I (again using a melamine formaldehyde resin as a cross-linking agent). A softer film (Sward hardness of 4) with excellent flexibility and solvent resistance was obtained. This resin was especially useful as a hand modifier in textile applications.

Having described my invention with a certain degree of particularity, it will be realized that numerous minor changes and variations, falling within the spirit and scope of this invention, will become obvious to those skilled in the art. It is not intended that this invention be limited to any of the materials which have been mentioned as examples, nor by any of the specific proportions which have been given for the sake of illustration, but it is intended to claim all novelty inherent in the invention, as well as all obvious modifications and variations thereof.

What is claimed is:

1. The process of producing a water dispersible polyester resin which comprises esterifying a mixture consisting essentially of:
    (a) an acid selected from the group consisting of isophthalic and terephthalic acids,
    (b) a non-oxidizing saturated aliphatic dicarboxylic acid containing from 4 to 18 carbon atoms, (c) a polyalkylene glycol selected from the group consisting of polyethylene glycols and polypropylene glycols having a molecular weight between 600 and 6000, (d) at least one saturated polyhydric alcohol containing from 2 to 16 carbon atoms and at least three hydroxy groups, a total of 0.95 to 1.8 moles of polyols being present per mole of dicarboxylic acid, and continuing esterification until polyester having an acid number of less than 30 is obtained.

2. In the process of claim 1, neutralizing the residual acidity with a neutralizing agent which is volatile at temperatures below about 375° F.

3. The process of claim 2 wherein the volatile neutralizing agent is a tri-alkylamine.

4. The process of claim 2 wherein the volatile neutralizing agent is a triethylamine.

5. Water dispersible resin produced by the process of claim 1.

6. An aqueous coating composition comprising water dispersible polyester resin produced by the process of claim 2 and a water-soluble melamine-formaldehyde resin.

7. Coated substrate prepared by spreading the coating composition of claim 6 in film form on a substrate and thereafter curing it.

8. The process of producing a water dispersible polyester resin which comprises esterifying a mixture consisting essentially of isophthalic acid, adipic acid, polyethylene glycol having a molecular weight of from 1000 to 2000, and at least one saturated polyhydric alcohol containing from 2 to 8 carbon atoms and at least three hydroxyl groups; a total of from 1.05 to 1.4 moles of polyols being present per mole of dicarboxylic acid; continuing esterification until polyester having an acid number of not more than 25 is obtained; and neutralizing the residual acidity with a neutralizing agent which is volatile at temperatures below about 375° F.

9. The process of claim 8 wherein the volatile neutralizing agent is a tri-alkyl amine.

10. The process of claim 8 wherein the volatile neutralizing agent is triethyl amine.

11. Water dispersible polyester resin produced by the process of claim 8.

12. An aqueous coating composition comprising water dispersible polyester resin produced by the process of claim 8 and a water soluble melamine-formaldehyde resin.

13. Coated substrate prepared by spreading the coating composition of claim 12 in film form on a substrate and thereafter curing it.

References Cited by the Examiner

UNITED STATES PATENTS

| | | | |
|---|---|---|---|
| 2,634,245 | 4/1953 | Arndt | 260—29.2 |
| 2,744,087 | 5/1956 | Snyder | 260—75 |
| 2,865,891 | 12/1958 | Michel | 260—75 |
| 2,915,486 | 12/1959 | Shelley | 260—29.2 |
| 3,160,679 | 12/1964 | Lew | 260—861 |
| 3,182,040 | 5/1965 | Watkins et al. | 260—75 |

MURRAY TILLMAN, *Primary Examiner.*

J. C. BLEUTGE, *Assistant Examiner.*